United States Patent [19]
Tanie et al.

[11] Patent Number: 5,361,186
[45] Date of Patent: Nov. 1, 1994

[54] SELF RECONFIGURABLE CELLULAR ROBOTIC SYSTEM

[75] Inventors: Kazuo Tanie, Ushiku; Hitoshi Maekawa, Tsukuba, both of Japan

[73] Assignees: Agency of Industrial Science and Technology; Ministry of International Trade and Industry, Tokyo, Japan

[21] Appl. No.: 21,869

[22] Filed: Feb. 24, 1993

Related U.S. Application Data

[63] Continuation-in-part of Ser. No. 763,426, Sep. 20, 1991, abandoned.

[30] Foreign Application Priority Data

Sep. 20, 1990 [JP] Japan .................................. 2-251384

[51] Int. Cl.⁵ .............................................. H01H 47/00
[52] U.S. Cl. ................................. 361/191; 307/149; 901/1; 180/8.1
[58] Field of Search ............... 361/144, 145, 160, 191, 361/210; 318/568.12, 625, 687; 901/1, 8, 10, 14, 16, 23; 180/8.1, 8.6; 307/38, 39, 40, 147, 149

[56] References Cited

U.S. PATENT DOCUMENTS 4,738,583 4/1988 Macconochie ...................... 414/735

Primary Examiner—Jeffrey A. Gaffin
Attorney, Agent, or Firm—Oblon, Spivak, McClelland, Maier & Neustadt

[57] ABSTRACT

A self reconfigurable cellular robotic system comprises cells having arms which can be independently extended and retracted in both directions along three orthogonal axes by actuators and coupling member at the distal ends of the arms for coupling adjacent cells. The arrangement of the cells can be modified by extending and retracting the arms and coupling and uncoupling the coupling members.

4 Claims, 9 Drawing Sheets

| ADDRESS SIGNAL | ARM SIGNAL | COUPLING SIGNAL |
|---|---|---|
| 0 0 1 | 1 1 0 0 | 0 1 0 1 |

| ADDRESS SIGNAL | ARM SIGNAL | COUPLING SIGNAL |
|---|---|---|
| 0 0 1 | 0 0 0 0 | 0 1 0 0 |
| 0 0 2 | 0 0 0 0 | 0 1 0 0 |
| 0 0 0 | 0 0 0 0 | 0 1 0 0 |
| 0 0 1 | 0 1 0 0 | 0 1 0 0 |
| 0 0 5 | 0 0 0 1 | 1 1 1 1 |
| 0 0 3 | 0 0 0 0 | 0 1 0 0 |
| 0 0 2 | 0 1 0 0 | 0 1 0 0 |
| 0 0 6 | 0 0 0 1 | 1 1 1 1 |
| 0 0 1 | 0 1 0 0 | 0 1 1 0 |
| 0 0 2 | 0 1 0 0 | 1 1 0 0 |

FIG.8(b)

| ADDRESS SIGNAL | ARM SIGNAL | COUPLING SIGNAL |
|---|---|---|
| 0 0 6 | 0 0 0 1 | 0 0 0 1 |
| 0 0 5 | 0 0 0 1 | 1 1 0 1 |
| 0 1 0 | 0 0 0 0 | 1 1 1 0 |
| 0 0 7 | 0 0 0 0 | 0 1 0 1 |
| 0 0 6 | 0 0 0 0 | 0 0 0 1 |
| 0 0 2 | 0 0 0 0 | 1 1 0 0 |
| 0 1 0 | 0 0 0 1 | 1 1 1 1 |
| 0 0 6 | 0 1 0 0 | 0 1 1 1 |
| 0 0 3 | 0 0 0 0 | 1 1 0 0 |
| 0 0 1 | 0 1 0 0 | 0 0 1 0 |
| 0 0 5 | 0 0 0 1 | 1 1 0 0 |
| 0 0 1 | 0 0 0 0 | 0 0 1 0 |
| 0 0 5 | 0 0 0 0 | 1 1 0 0 |
| 0 0 0 | 0 0 1 0 | 0 1 1 0 |
| 0 0 6 | 1 1 0 0 | 1 1 1 1 |

FIG.8(c)

| ADDRESS SIGNAL | ARM SIGNAL | COUPLING SIGNAL |
|---|---|---|
| 0 0 0 | 0 0 1 0 | 0 0 1 0 |
| 0 0 4 | 0 0 0 0 | 0 1 1 0 |
| 0 0 0 | 0 0 0 0 | 0 0 1 0 |
| 0 0 6 | 0 1 0 0 | 1 0 1 1 |
| 0 0 0 | 0 0 0 0 | 0 1 1 1 |
| 0 0 1 | 0 0 0 0 | 0 1 1 0 |
| 0 0 5 | 0 0 0 0 | 1 1 0 1 |
| 0 1 0 | 0 0 0 1 | 1 1 1 0 |
| 0 0 6 | 0 0 0 0 | 1 0 1 1 |
| 0 1 0 | 0 0 0 0 | 1 1 1 0 |
| 0 0 5 | 0 0 1 0 | 1 1 1 1 |
| 0 0 7 | 1 0 0 0 | 1 1 0 1 |

FIG.8(d)

| ADDRESS SIGNAL | ARM SIGNAL | COUPLING SIGNAL |
|---|---|---|
| 0 0 5 | 0 0 1 0 | 1 0 1 0 |
| 0 0 0 | 0 0 0 0 | 0 0 1 1 |
| 0 0 9 | 0 0 0 0 | 1 1 1 0 |
| 0 0 8 | 0 0 0 0 | 0 1 1 0 |
| 0 0 4 | 0 0 0 0 | 0 0 1 0 |
| 0 0 7 | 1 0 0 0 | 1 1 0 1 |
| 0 0 5 | 0 0 0 0 | 1 0 1 0 |
| 0 0 5 | 0 0 0 0 | 1 1 1 1 |
| 0 1 0 | 0 0 0 0 | 1 1 1 1 |
| 0 0 6 | 0 0 0 0 | 1 1 1 1 |
| 0 0 4 | 0 0 0 0 | 0 1 1 1 |
| 0 0 0 | 0 0 0 0 | 0 1 1 1 |
| 0 0 9 | 0 0 0 0 | 1 1 1 1 |

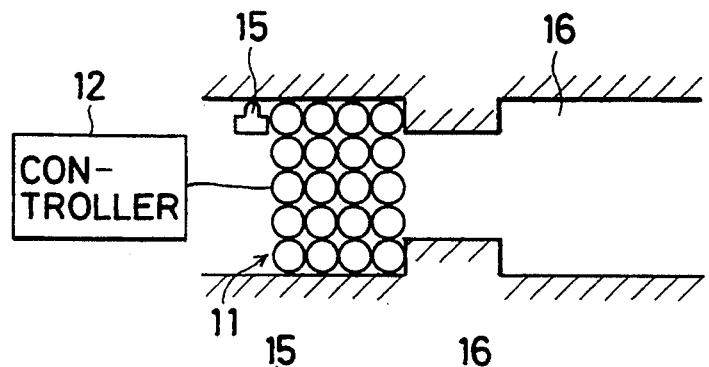
FIG.10(a)
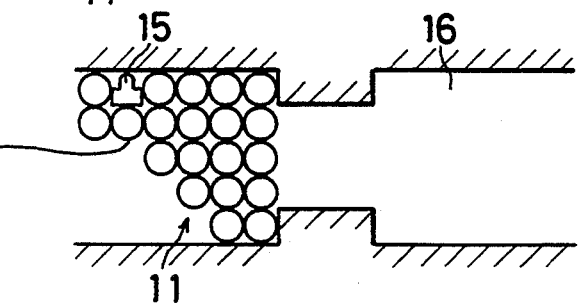
FIG.10(b)
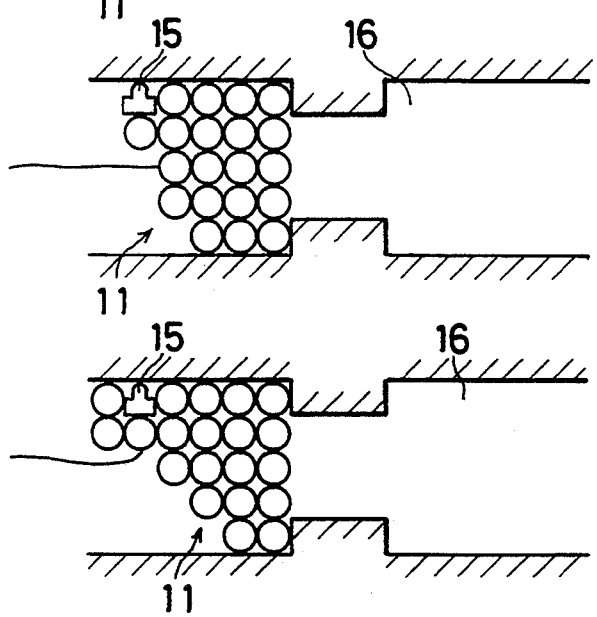
FIG.10(c)
FIG.10(d)
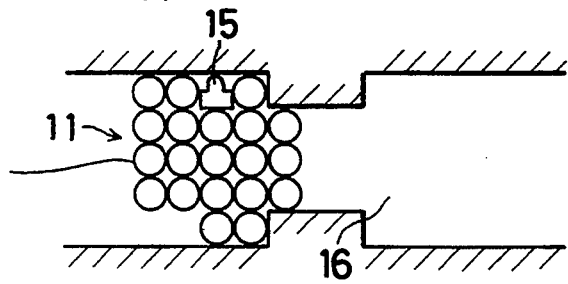
FIG.10(e)
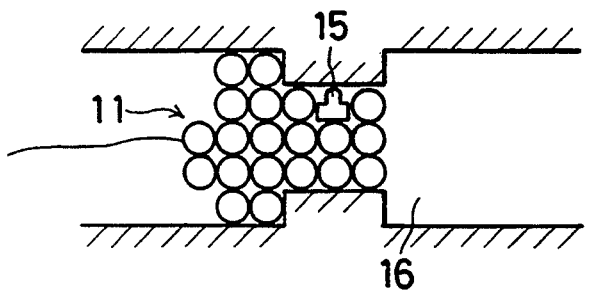
FIG.10(f)
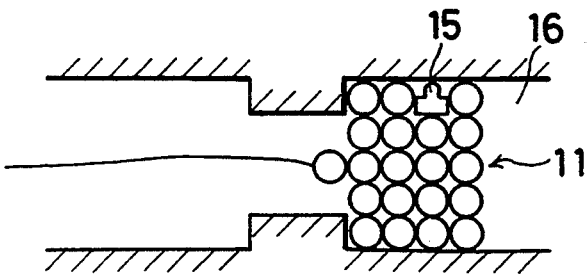

SELF RECONFIGURABLE CELLULAR ROBOTIC SYSTEM

CROSS-REFERENCE TO RELATED APPLICATION

This is a continuation-in-part application of patent application Ser. No. 763,426, filed Sep. 20, 1991, which is abandoned.

BACKGROUND OF THE INVENTION

1. Field of the Invention

This invention relates to a self reconfigurable cellular robotic system comprising a plurality of cells arranged in row or lattice formation and capable of changing the state of cell interconnection for varying its external shape according to the intended purpose.

2. Prior Art Statement

The degree to which the machines, devices, apparatuses and the like in general use today can be reduced in size is limited. Moreover, size reduction is intrinsically accompanied by a limitation of the machine etc. to a narrower range of functions. Thus where the size of a piece of equipment is reduced so as, for example, to make it transportable into a small space or through a narrow passage or to allow it to be used for inspection of a small space or narrow path, it is frequently found that the size reduction so limits its functionality that it becomes incapable of carrying out the intended task. There is a recognized need for a solution to this problem.

The present invention was accomplished in light of the foregoing circumstances and has as its object the provision of a self reconfigurable cellular robotic system capable of changing its shape in accordance with the work at hand so as to be able, for example, to carry out tasks or operate equipment for carrying out tasks in limited spaces.

SUMMARY OF THE INVENTION

For achieving this object, the present invention provides a self reconfigurable cellular robotic system comprising a plurality of cells each comprising a cell body, six arms extensible and retractable relative to the cell body along three orthogonal axes, coupling members provided one at the distal end of each arm for coupling with the coupling members of arms of adjacent cells, an actuator for selectively driving each arm into a retracted state and an extended state, and a control section for controlling coupling and uncoupling of the coupling members, the coupling member of at least one arm of each cell being coupled with a coupling member of an adjacent cell.

Thus the self reconfigurable cellular robotic system according to the invention comprises a plurality of cells each coupled with at least one other cell through coupling members so that all of the cells are either directly or indirectly coupled with each other, This makes it possible to send electric signals though the coupling members to any given cell so as to extend or retract its arms and couple and uncouple its coupling members, whereby the cell can be moved and the shape of the group of cells can be reconfigured as appropriate for performing a specific task. While each cell has only a simple function, by controlling the actions of the individual cells it becomes possible to vary the state in which the cells are coupled so as to modify the shape of the cell group and carry out complex operations. The system can thus be controlled to manifest a wide variety of functions as required for specific tasks.

The above and other features of the present invention will become apparent from the following description made with reference to the accompanying drawings.

BRIEF DESCRIPTION OF THE DRAWINGS

FIG. 8(b) is an explanatory view illustrating a sequence signal transmitted to the system for changing the shape of the self reconfigurable cellular robotic system shown in FIG. 6(b) to the shape thereof shown in FIG. 6(c).

FIG. 8(c) is an explanatory view illustrating a sequence signal transmitted to the system for changing the shape of the self reconfigurable cellular robotic system shown in FIG. 6(c) to the shape thereof shown in FIG. 6(d).

FIG. 8(d) is an explanatory view illustrating a sequence signal transmitted to the system for changing the shape of the self reconfigurable cellular robotic system shown in FIG. 6(d) to the shape thereof shown in FIG. 6(e).

FIGS. 10(a) to 10(f) are views for explaining an application of the self reconfigurable cellular robotic system of the invention as an apparatus for transporting the sensor section of a telemeter.

DESCRIPTION OF THE PREFERRED EMBODIMENT

Figure 1:
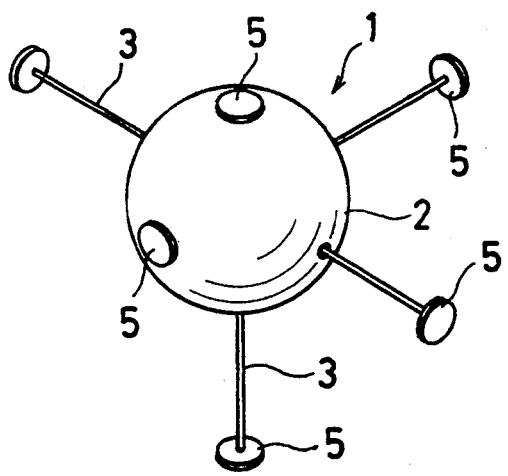
FIG. 1 is a perspective view of an embodiment of a cell of the self reconfigurable cellular robotic system according to the invention.
Figure 2:
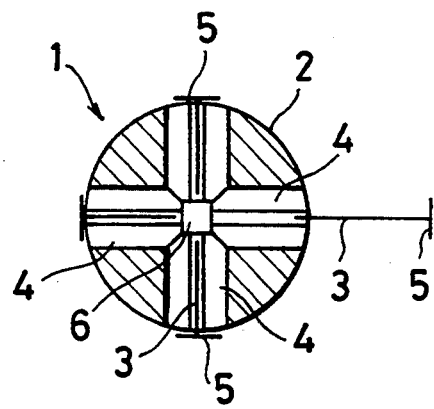
FIG. 2 is a schematic sectional view of the cell of FIG. 1.

An embodiment of a cell of the self reconfigurable cellular robotic system according to the present invention is schematically illustrated in FIGS. 1 and 2.

The system comprises a plurality of cells 1. Each cell 1 has a cell body 2 and six arms which extend in both directions along three axis intersecting perpendicularly at the center of the cell body 2. The arms 3 can be extended and retracted. While the illustrated cell body 2 is spherical, cells of cubic or other appropriate shape can also be used. The six arms 3 of each cell can be independently extended and retracted by six actuators 4 provided inside the cell body 2 and each is selectively switched between a retracted state and an extended state by commands from a controller 6 located at the center of the cell body 2. Each of the actuators 4 can be disposed at a position offset from the axis of the arms 3 with which it is associated so as not to interfere with the other actuators 4 and arms 3.

Each of the arms 3 of the cell 1 has a coupling member 5 at its outer end. The coupling members 5 of adjacent cells can couple with each other to link a large number of the cells in a row, a two-dimensional lattice or a three-dimensional lattice, thereby constituting a self reconfigurable cellular robotic system.

Figure 3A:
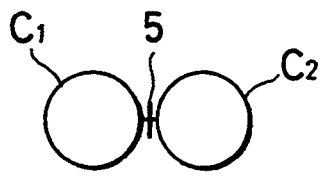
FIG. 3(a) schematic view for explaining the coupled state of two cells with their arms retracted.
Figure 3B:
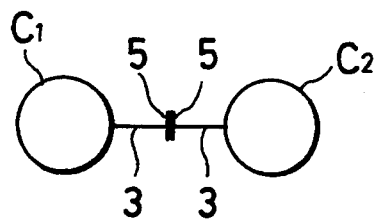
FIG. 3(b) is a schematic view for explaining the coupled state of two cells with their arms extended.
Figure 3C:
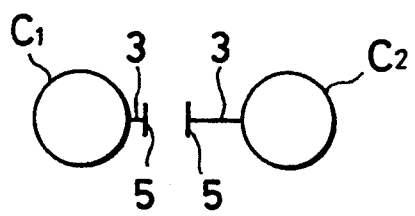
FIG. 3(c) is a schematic view for explaining the uncoupled state of two cells with the arm of one cell retracted.

FIG. 3 schematically shows the coupling and positional relationship between two adjacent cells $C_1$ and $C_2$. FIG. 3(a) shows the coupling members 5 of the cells $C_1$ and $C_2$ coupled with the arms 3 in the retracted state, FIG. 3(b) shows them coupled with the arms 3 in the extended state, and FIG. 3(c) shows them uncoupled with the arm of cell $C_1$ in the retracted state. As will be better understood from the explanation given later, when the adjacent cells $C_1$ and $C_2$ are coupled with their arms extended (as shown in FIG. 3(b)), each is required to be coupled with another adjacent cell. For enabling this, the length by which each arm 3 is extended from its retracted state is set to be one-half the distance between the coupling members 5 of two opposed arms of one and the same cell when the arms are in the retracted state. What this means is that the arms 3 are able to extend by a distance equal to that between the center of the body and the coupling member 5 of an arm 3 in the retracted state. Therefore, when two cells are positioned as shown in FIG. 3(c) and the arm 3 of the cell $C_2$ is retracted, there is room for a single cell between the two cells $C_1$ and $C_2$.

Figure 4:
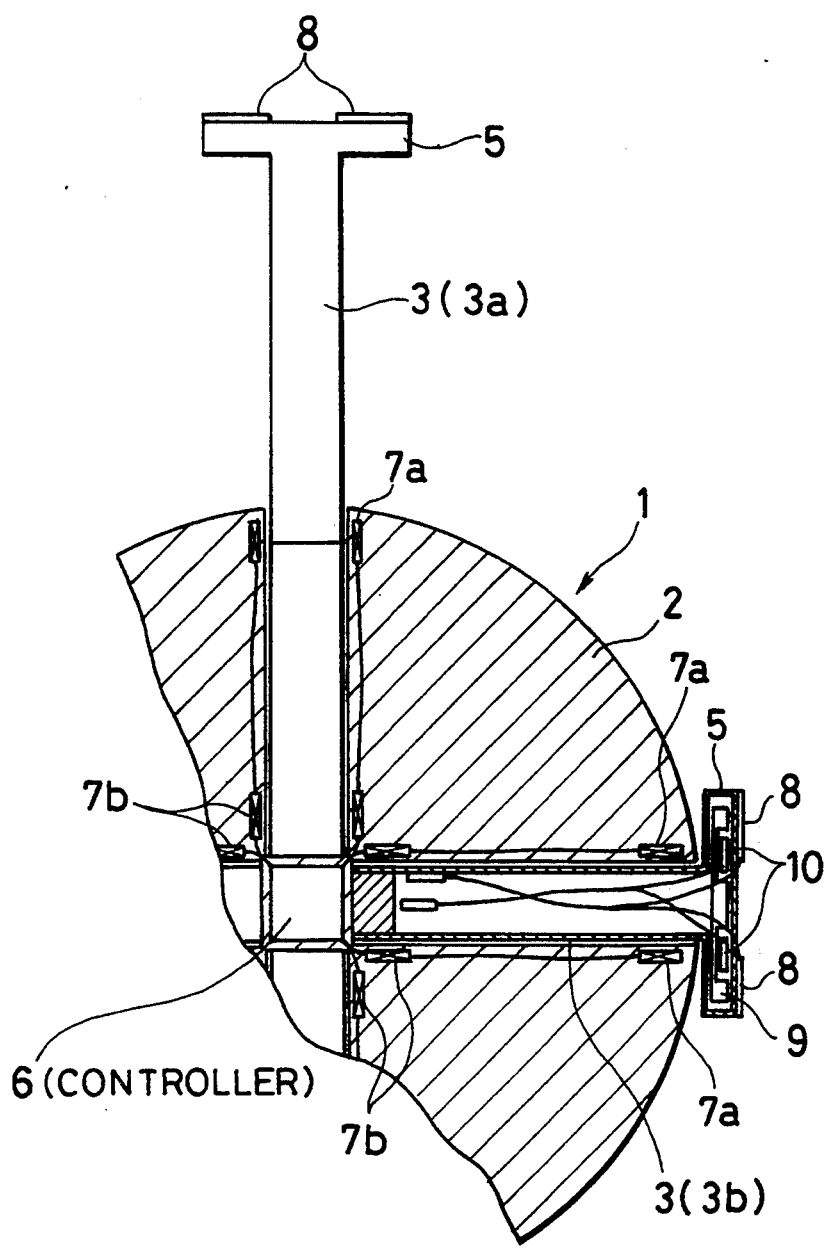
FIG. 4 is an enlarged sectional view, partially cut away, of one example of a specific cell structure.

A specific example of the structure of the cells 1 is shown in FIG. 4. In this embodiment, solenoids used as the actuators and the cell body and the arms are both made of an insulating material such as plastic. Each of the portions of the cell body 2 where an arm 3 extends and retracts is provided with a solenoid 7a for extension and a solenoid 7b for retraction, which are electrically connected with the controller 6 located at the center of the cell body 2. The outer surface of the coupling member 5 at the end of each arm 3 is provided with an electrode 8 for transmission of electric signals from and to another cell. The interior of the coupling member 5 is provided with an electromagnet 9 and a solenoid 10 for driving the electromagnet 9. The electromagnet 9 and the solenoid 10 are electrically connected with the controller 6 by conductive brushes, signal wire or the like. The details of the aforementioned electrical connection have been omitted from the accompanying drawings.

With this arrangement, when the solenoid 10 is driven, the electromagnet 9 is actuated and attracts the coupling member 5 adjacent thereto. As a result, the two coupling members 5 are both mechanically coupled and, through the electrode 8, electrically coupled. When the solenoid 7a is driven, it attracts a magnetic body provided on the arm 3 and causes the arm 3 to project out of the cell body 2 to its extended position. On the other hand, when the solenoid 7b is driven, it attracts the magnetic body and causes the arm 3 to retract into the cell body 2. In FIG. 4, the arm 3a is shown in , the extended state and the arm 3b in the retracted state. By controlling the extension and retraction of the arms and the adherence and separation of the coupling members in the forgoing manner the individual cells can be moved to desired positions.

Figure 5:
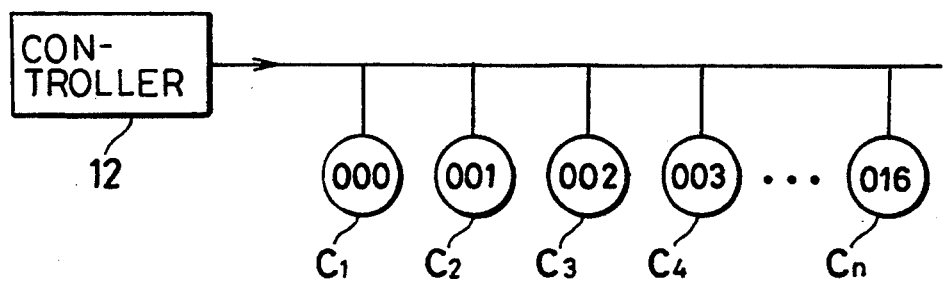
FIG. 5 is a schematic view showing how signals are transmitted to plurality of cells.

In the self reconfigurable cellular robotic system according to the invention, each cell 1 is mechanically and electrically coupled, coupling member-to-coupling member, with at least one other cell and the configuration of the group of cells is varied by varying the positions of the individual cells by coupling and uncoupling their coupling members and extending and retracting their arms. The electrical relationship among the interconnected cells of such a group can be represented as shown in FIG. 5 and, as can be seen from this figure, is equivalent to a single line of series connected cells $C_1$, $C_2$ ... $C_n$. The cells are assigned addresses such as 000, 001, 002 ... and are individually operated by command signals transmitted via a signal line.

The transmission of the command signals is conducted by a controller 12. The controller 12 first outputs a timing pulse and then a pulse train for cell selection. Each cell counts the number of selection pulses up to the time that the next timing pulse is received. If, for example, ten pulses are output between two timing pulses, the gate of the address 10 cell opens and the cell accepts the ensuing arm state selection signal. The arm selection signal comprises 6 pulses for designating the extension/retraction state of the cells six arms. Following this, a coupling member coupling/uncoupling command is output to the cell.

The controller 6 of each cell 1 discriminates whether or not the serially received pulse signals are intended for that cell and, if they are, then discriminates which of its six arms the signal is for, whereafter it sends appropriate signals to the solenoids (actuators) for extending-/retracting and coupling/uncoupling the respective arms.

While the cells 1 constituting the self reconfigurable cellular robotic system can be fabricated in any size desired, it is generally preferable to make them as small as technically possible so as to enable the system to operate in the smallest possible space. They are thus preferably on the millimeter order.

As explained above, the cells 1 of the self reconfigurable cellular robotic system are individually capable of only the simple functions of putting their arms in one or the other of two positions, extended or retracted, and of putting their coupling members in one or the other of two states, coupled or uncoupled. However, as will be understood from the description to follow, the system as a whole is capable of complex operations enabling it to carry out a wide range of functions.

Figure 6A:
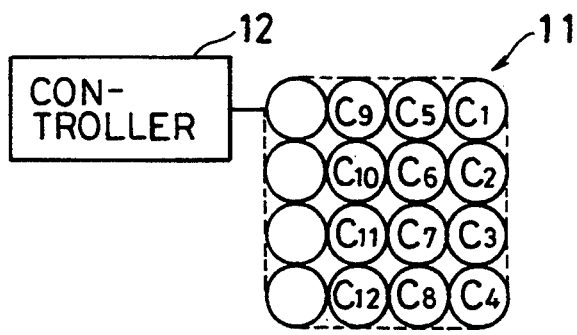
FIGS. 6(a) to 6(e) are views for explaining operating modes used by the self reconfigurable cellular robotic system for hanging its shape.
Figure 6B:
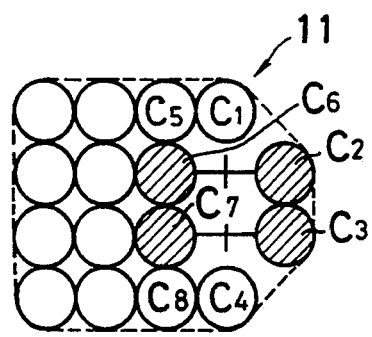

Basic operations of the self reconfigurable cellular robotic system are illustrated in FIGS. 6(a)-6(b), in which the system is designated by reference numeral 11. FIG. 6(a) to FIG. 6(e) shows how a self reconfigurable cellular robotic system 11 formed of 16 cells arranged 4×4 in a single plane (FIG. 6a) can be progressively modified into a form that is narrower at one end. The progressive changes of the shape are made, as described above, by the address signals, arm extension/retraction signals and coupling member coupling/uncoupling signals from the controller 12. The cells having their arms and/or coupling members transformed are indicated by shading.

Figures 7, 8A:
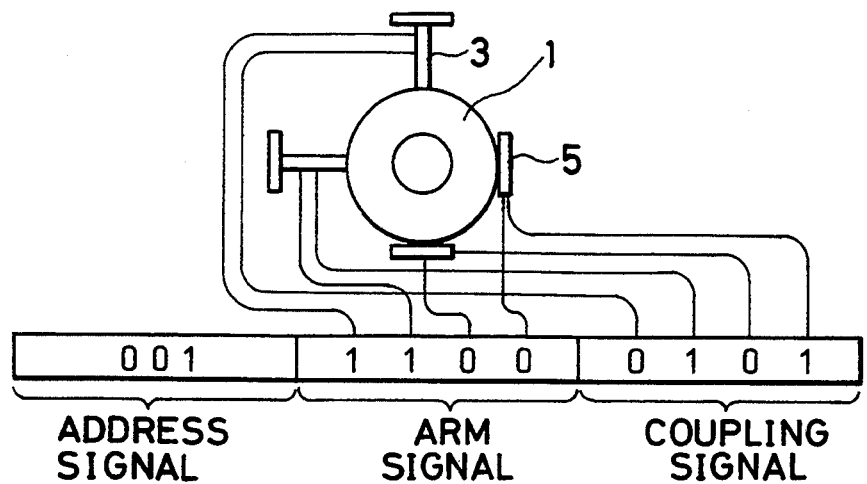
FIG. 7 is a schematic view for explaining the relationship of signals transmitted to a cell with arms and coupling members, of the cell actuated in accordance with the signals.
FIG. 8(a) is an explanatory view illustrating a sequence signal transmitted to the system for changing the shape of the self configurable cellular robotic system shown in FIG. 6(a) to the shape thereof shown in FIG. 6(b).

As illustrated in FIG. 7, the arm extension/retraction signal is composed of a binary-coded number of four ciphers. It is set that the first figure of the four-cipher number is for actuating the first arm disposed on the upper side of the cell 1 in FIG. 7, the second figure for actuating the second arm disposed on the left side, the third figure for actuating the third arm disposed on the lower side, and the fourth figure for actuating the fourth arm disposed on the right side, respectively. Similarly, the coupling member coupling/uncoupling signal is composed of a binary-coded number of four ciphers. It is set that the first figure of the four-cipher number is for actuating the coupling member of the first arm, the second figure for actuating the coupling member of the second arm, the third figure for actuating the coupling member of the third arm, and the fourth figure for actuating the coupling member of the fourth arm, respectively. It is further set that when the figure is "1" the arm is actuated to be extended and the coupling member is actuated to be coupled with the adjacent coupling member and that when the figure is "0", the arm is actuated to be retracted and the coupling member is actuated to be uncoupled from the adjacent coupling member.

FIG. 6(a) shows the state wherein all cells of the system are coupled with each other via the adjacent coupling members, with all of their arms retracted. This state is changed to the state of FIG. 6(b) by the following procedures. As shown in the first stage of FIG. 8(a), an address signal of [001] an arm extension/retraction signal of [0000] and a coupling member coupling/uncoupling signal of [0100] are sent from the controller 12 to the system. As a result, the coupling member of the second arm of the cell $C_2$ is held coupled with the coupling member of the fourth arm of the cell $C_6$ and the remaining three coupling members of the cell $C_2$ are uncoupled. Then, signals [002-0000-0100] are sent to the system to hold the coupling member of the second arm of the cell $C_3$ coupled with the coupling member of the fourth arm of the cell $C_7$ and uncouple the remaining three coupling members of the cell $C_3$. Further, signals [000-0000-0100] are sent to the system to hold the coupling member of the second arm of the cell $C_1$ coupled with the coupling member of the fourth arm of the cell $C_5$ and uncouple the remaining three coupling members of the cell $C_1$. Subsequently, signals [001-0100-0100] are sent to the system. As a result, since the coupling member of the second arm of the cell $C_2$ is coupled with the coupling member of the fourth arm of the cell $C_6$, as described above, the second arm of the cell $C_2$ is extended. Then, signals [005-0001-1111] are sent to the system to hold the four coupling members of the cell $C_6$ coupled with the corresponding coupling members of the adjacent cells and extend its fourth arm, thereby advancing the cell $C_2$ by one cell.

Further, signals [003-0000-0100] are sent to the system to hold the coupling member of the second arm of the cell $C_4$ coupled with the coupling member of the fourth arm of the cell $C_8$ and uncouple the remaining three coupling members of the cell $C_4$, then signals [002-0100-0100] are sent to the system to extend the second arm of the cell $C_3$ with its coupling member coupled with the coupling member of the fourth arm of the cell. $C_7$, and thereafter the signals [006-0001-111] are sent to the system to hold the four coupling members of the cell $C_7$ coupled with the corresponding coupling members of the adjacent cells and extend its fourth arm, thereby advancing the cell $C_3$ by one cell in the same manner as in the case of the cell $C_2$.

Finally, signals [001-0100-0110] and [002-0100-1100] are sent to the system to couple the coupling member of the third arm of the cell $C_2$ with the coupling member of the first arm of the cell $C_3$. Thus, the configuration of the self reconfigurable cellular robotic system shown in FIG. 6(a) can be changed to that shown in FIG. 6(b).

Figure 6C:
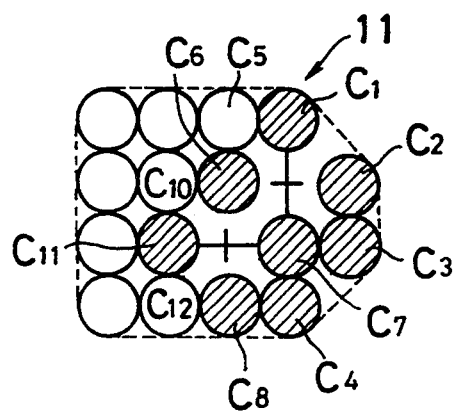
Figure 6D:
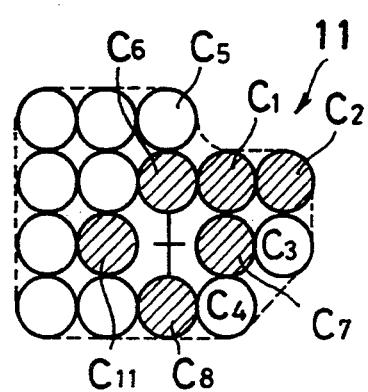
Figure 6E:
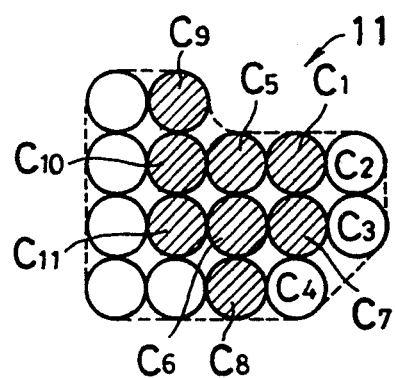

Multistage signals for changing the configuration of the system shown in FIG. 6(b) to that shown in FIG. 6(c) are as shown in FIG. 8(b), multistage signals for changing the configuration of the system shown in FIG. 6(c) to that shown in FIG. 6(d) are as shown in FIG. 8(c), and multistage signals for changing the configuration of the system shown in FIG. 6(d) to that shown in FIG. 6(e) are as shown in FIG. 8(d), respectively. By sending these multistage signals to the system from the controller 12, the system changes its configuration to that shown in FIG. 6(e).

In FIG. 6(a) to FIG. 6(e), the cells are two-dimensionally disposed. For this reason, each of the signals for actuating the four arms and four coupling members to change the configuration of the system is composed of a binary-coded number of four ciphers. In the case of three-dimensionally disposed cells, the front and back sides of each cell is provided each with an additional arm having a coupling member and each of the signals for actuating the six arms and six coupling members to change the configuration of the system is composed of a binary-coded number of six ciphers. Thus, it is possible to easily move the three-dimensionally disposed cells to change the configuration of the system to a desired configuration.

Since the appearance of a place where the self reconfigurable cellular robotic system is to be actuated can be obtained beforehand by the actual measurement from the design drawing of the place, etc. it is simulated by a computer how the cells of the system should be moved in order for the system to effectively reach a destination, thereby obtaining a suitable routine. The command signals are prepared on the basis of the suitable routine.

The modification of the overall system shape through the rearrangement of its cells by operations of the type explained above makes it possible for the system to carry out specific tasks. An example is illustrated in FIGS. 9(a)–9(e), which show a series of operations implemented for using a self reconfigurable cellular robotic system 11 to pass an electric wire 14 through an underground conduit 13.

Figure 9A:
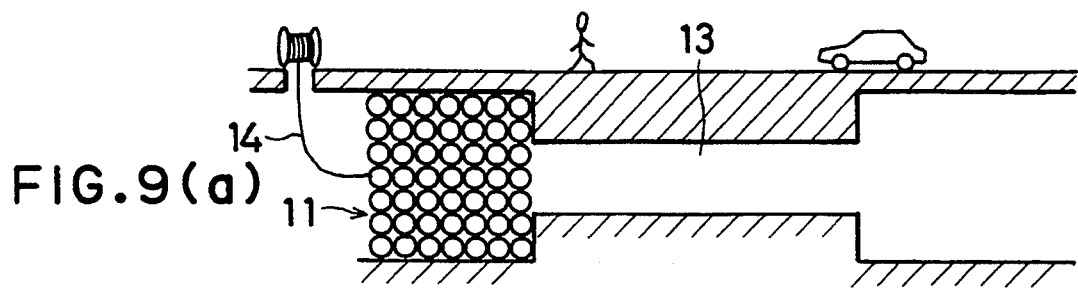
FIG. 9(a) to 9(e) are views for explaining an application of the self reconfigurable cellular robotic system of the invention as an apparatus for passing an electric wire through an underground conduit.
Figure 9B:
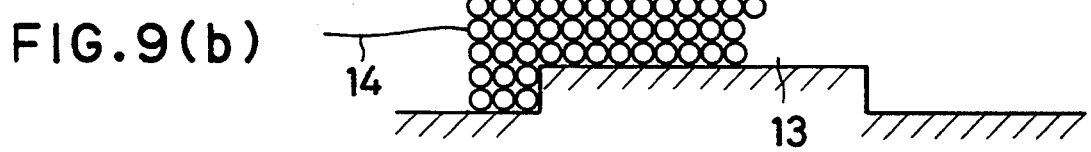
Figure 9C:
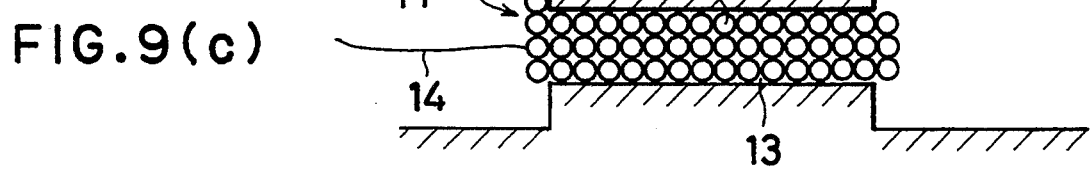
Figure 9D:
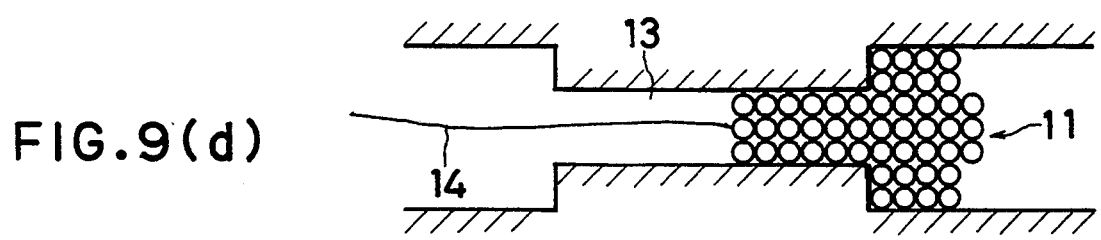
Figure 9E:
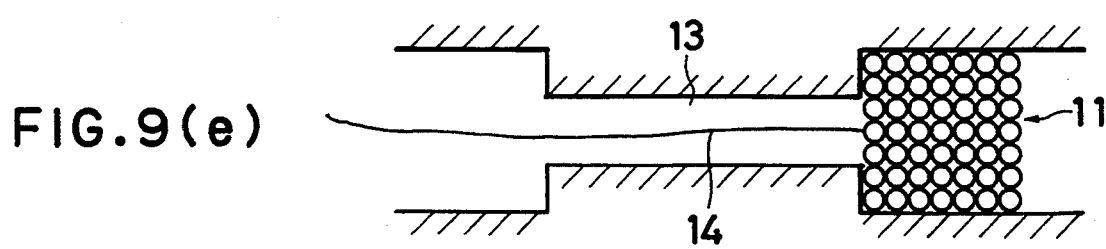

A self reconfigurable cellular robotic system 11 consisting of a plurality of cells disposed in a square arrangement is disposed at an inlet port of the conduit and an electric wire 14 is attached to the rearmost cell (FIG. 9(a)). The cells are then progressively sent into the conduit with the cells nearest the inlet port (FIGS. 9(b) and 9(c)). The signals required for this operation are transmitted via the electric wire 14. The cells reaching the outlet port of the conduit are regrouped (FIGS. 9(d) and 9(e)). The cells remaining in the conduit are progressively pulled out until the last one connected to the electric wire 14 has been added to the regrouped cells to reestablish the original square configuration and complete the passage of the electric wire 14 through the conduit.

FIGS. 10(a)–10(f) show an example in which a self reconfigurable cellular robotic system 11 is used for supporting an ultra-small telemeter sensor 15 from the rear side and transporting it so as to enable inspection of the surface of a small, inaccessible space 16. After the sensor 15 has been introduced into the inlet port (FIG. 10(a)), the controller 12 issues commands for bringing specified cells into position for supporting the sensor 15 from behind and both sides (FIGS. 10(b) and 10(c)). It then reconfigures the system to match the space while bringing the sensor 15 to, and supporting it at, the surface of the space, whereafter it controls the system to transport the sensor 15 along the surface to be inspected (FIGS. 10(d)-10(f)).

The self reconfigurable cellular robotic system according to this invention is by no means limited to the performance of the specific tasks mentioned above but can be used for a broad range of tasks which have to be carried out at places inaccessible or too small to enter by humans or conventional equipment.

Although the individual cells of the self reconfigurable cellular robotic system according to this invention are individually capable of only simple functions, the system can be reconfigured by controlling the individual cells so as to assume the optimum shape for the task at hand and, as such, is able to transport equipment into minute spaces and through narrow passages or to perform various jobs in confined regions.

What is claimed is:

1. A self reconfigurable cellular robotic system comprising a plurality of cells each comprising a cell body, six arms extensible and retractable relative to the cell body along three orthogonal axes, coupling members provided one at the distal end of each arm for coupling with the coupling members of arms of adjacent cells, an actuator for selectively driving each arm into a retracted state and an extended state, and a control section for controlling coupling and uncoupling of the coupling members, the coupling member of at least one arm of each cell being coupled with a coupling member of an adjacent cell.

2. A self reconfigurable cellular robotic system according to claim 1, wherein each arm is able to extend by a distance equal to the distance between the center of the body and the coupling member of the arm at its position when the arm in the retracted state.

3. A self reconfigurable cellular robotic system according to claim 1, wherein each coupling member is provided with an electromagnet and adjacent cells are mechanically coupled by their coupling members owing to magnetic attraction between their electromagnets.

4. A self reconfigurable cellular robotic system according to claim 1, wherein each coupling member is provided with an electrode on the outer surface thereof and adjacent cells are electrically coupled by their coupling members owing to contact between their electrodes.

* * * * *